H. E. PRITCHETT.
DISTRIBUTING HOPPER.
APPLICATION FILED MAR. 22, 1912.
1,038,957.
Patented Sept. 17, 1912.
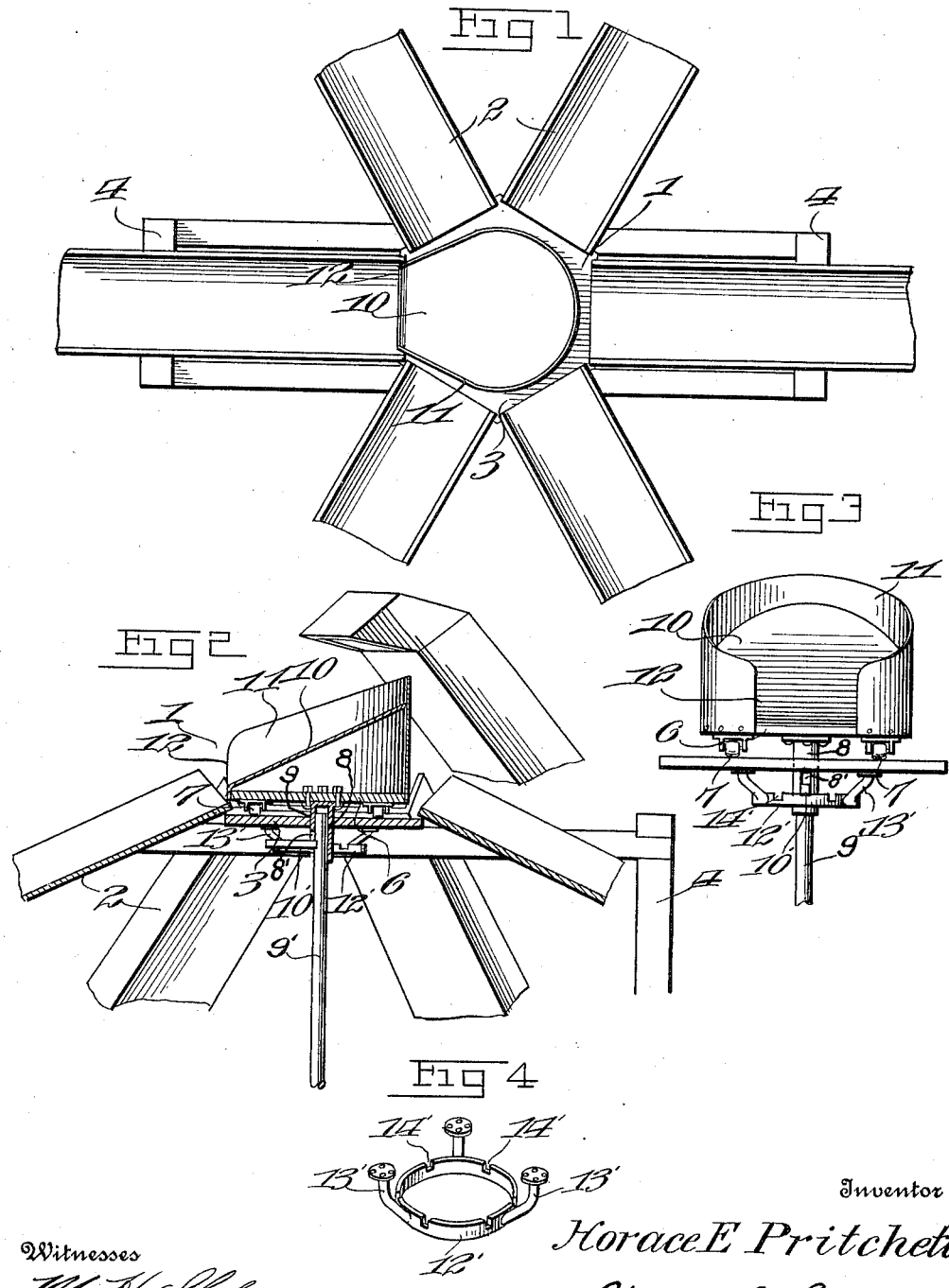

UNITED STATES PATENT OFFICE.

HORACE E. PRITCHETT, OF NIANTIC, ILLINOIS.

DISTRIBUTING-HOPPER.

1,038,957. Specification of Letters Patent. Patented Sept. 17, 1912.

Application filed March 22, 1912. Serial No. 685,445.

*To all whom it may concern:*

Be it known that I, HORACE E. PRITCHETT, a citizen of the United States of America, residing at Niantic, in the county of Macon and State of Illinois, have invented new and useful Improvements in Distributing-Hoppers, of which the following is a specification.

My present invention relates to improvements in distributing mechanisms for grain mills and the like and has particular application to certain novel and useful improvements in a distributing hopper and its support.
In carrying out this invention, it is my purpose to provide a distributing hopper by means of which the grain or like material may be distributed to a plurality of bins arranged concentrically about the hopper and in communication therewith through the medium of chutes.

Furthermore, I aim to provide a hopper of this type into which the grain may be delivered from an elevator or the like and distributed therefrom to a plurality of bins radiating from the hopper, the hopper being revolubly mounted to facilitate the distribution of the grain.

It is also my purpose to provide a hopper of this class which may be rotated upon its support to facilitate the distribution of the grain to the bins and locked in its distributing or feeding position.

With the above-stated objects in view and others of a like nature, the invention consists in the construction, combination and arrangement of parts hereinafter set forth in and falling within the scope of the appended claim.
In the accompanying drawing forming a part of this specification and wherein has been illustrated the preferred embodiment of the invention; Figure 1 is a top plan view of my improved hopper showing the location of the same with respect to the chutes. Fig. 2 is a vertical sectional view. Fig. 3 is an enlarged detail view of the hopper and its support. Fig. 4 is a perspective view of a detail of the invention.
Similar reference characters designate like parts throughout the several views.

Referring now to the accompanying drawing in detail, the numeral 1 indicates my improved hopper and support as an entirety, the hopper being rotatably mounted upon the support and adapted for communication with a plurality of chutes 2 radiating from the hopper and inclined downwardly therefrom so that the grain delivered to the chutes from the hopper may be fed by gravitation to bins or the like (not shown), each chute having communication with a bin as usual. In order to convey the grain to the hopper, a suitable conveyer such as an elevator may be utilized to deposit the grain or other material into the distributing hopper 1, as shown diagrammatically in Fig. 2. My improved hopper and support, comprises a base or platform 3 supported upon suitable standards 4 and provided with a squared, hexagonal or other shaped edge 5 designed to receive the chutes 2 so that the latter may radiate from the hopper, the shape of the edge of the platform depending upon the number of chutes employed. Mounted upon this platform 3 and rotatable thereon to communicate with any one of the chutes, is the hopper 1 which, as shown, includes a bottom wall 6 provided with a plurality of concentrically arranged casters 7 designed to engage the upper surface of the platform 3 so as to minimize friction in the rotation of the hopper upon the platform. Depending from the bottom wall 6 of the hopper 1 and secured thereto in any suitable manner is a sleeve 8 adapted to pass through an opening 9 in the platform 3 and terminating at an appropriate distance below such platform and designed to impart movement to the hopper. This sleeve is formed with a vertical slot 8' and slidably mounted within such sleeve is a shaft 9' provided with a pin 10' designed to project through the slot in the sleeve and impart movement to the hopper in the movement of the shaft 9', the latter being provided with a suitable form of handle 11' by means of which the shaft and hopper may be rotated.

Fixed to the under surface of the base or platform 3, is a ring or annulus 12' connected to the platform by means of radial arms 13'. Formed in the upper edge of the ring or annulus 12' are a plurality of notches 14' spaced equal distances from one another about the ring and adapted to receive the pin 10' to lock the hopper to the platform and to prevent accidental turning movement of such hopper, each slot alining with one of the sides of the platform so that the mouth of the hopper may be locked in communication with the respective chute.

Thus, it will be seen that the shaft 9' may be slid vertically independently of its rotary movement so as to engage the pin 10' in the notches 14' and disengage the pin from such notches, thereby locking and unlocking the hopper.

Fixed to the bottom wall of the hopper is a relatively inclined wall 10 of a configuration similar to that of the bottom wall 6 and inclosing the walls 6 and 10 is a side wall 11 rigidly secured to each of the first-named walls and terminating at the lower end of the inclined wall 10 in an outlet 12. The rear end of the wall 11, owing to the upward inclination of the wall 10, is a less distance from the upper edge of the side wall than the lower end of such inclined wall, thus enabling a relatively large quantity of the material to be discharged from the outlet 12. The bottom wall 6 and the inclined wall 10 taper toward the outlet 12 so as to restrict the latter with respect to the maximum diameter of the hopper so as to direct the grain on to the chute 2, but, it will be seen that the relatively greater height of the side wall 11 at the outlet 12 is substantially equal in area to the maximum diameter of the hopper, thereby enabling a relatively large quantity of material to be discharged from the hopper, as before stated.

From this construction, it will be seen that when the grain elevator is operated to deliver grain into the hopper 1, the latter may be rotated, independently of the operation of the elevator, so that the grain may be discharged through any one of the chutes 2 whereby the bin or other device at the free end of such chute may be filled or loaded and subsequent to the loading action the hopper revolved so that another one of the bins may be filled. Furthermore, it will be apparent that the hopper may be locked against accidental movement when feeding the material to one or the other of the bins.

From the foregoing description taken in connection with the accompanying drawing, the construction and mode of operation of my invention will be readily apparent, and while I have described one form of my invention by way of illustration, I desire to have it understood that I do not limit myself to the exact details of construction herein described and delineated, as modification and variation may be made within the scope of the claim and without departing from the spirit of the invention.

I claim:

The combination with a plurality of chutes, of a platform disposed intermediate said chutes and provided with a central opening, a hopper mounted upon said platform and rotatable thereon, a sleeve secured to the under surface of the hopper and projected through the opening in the platform and formed with a vertical slot, a shaft slidably disposed within the sleeve, a pin carried by the shaft and projecting through the slot in said sleeve whereby the hopper may be rotated in the rotation of the shaft, and an annulus connected to the under side of the platform and provided with a plurality of notches spaced apart and adapted to receive the said pin to hold the hopper against accidental movement.

In testimony whereof I affix my signature in presence of two witnesses.

HORACE E. PRITCHETT.

Witnesses:
 G. LESTER STAHL,
 O. T. PRITCHETT.